Figure 1:
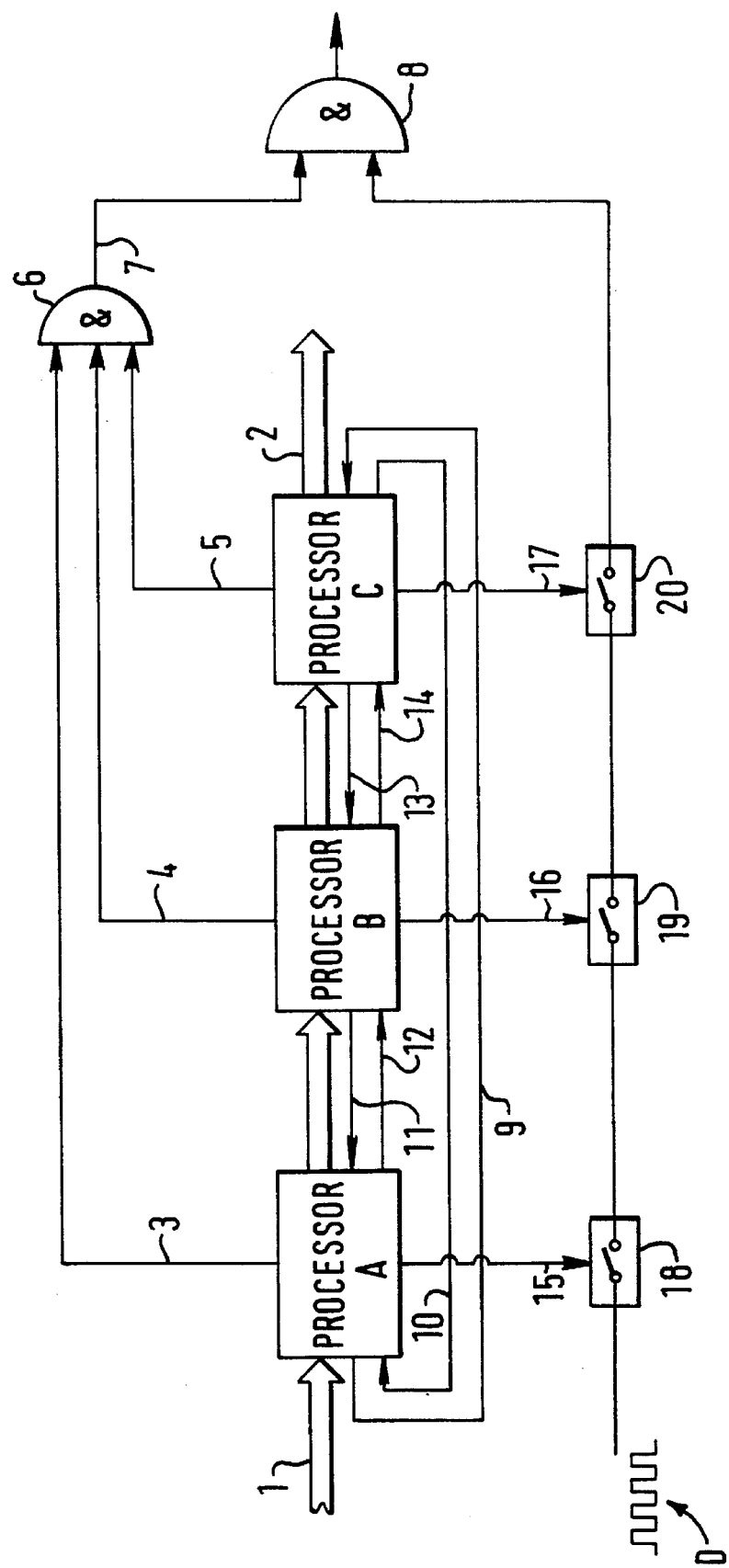

United States Patent [19]

George et al.

[11] Patent Number: 5,504,860
[45] Date of Patent: Apr. 2, 1996

[54] SYSTEM COMPRISING A PROCESSOR

[75] Inventors: Terence M. George, Corsham; Richard J. Roberts, Melksham, both of Great Britain

[73] Assignee: Westinghouse Brake and Signal Holding Limited, Wiltshire, United Kingdom

[21] Appl. No.: 341,341

[22] Filed: Nov. 17, 1994

Related U.S. Application Data

[63] Continuation of Ser. No. 161,990, Dec. 3, 1993, abandoned, which is a continuation of Ser. No. 84,785, Jun. 29, 1993, abandoned, which is a continuation of Ser. No. 445,874, Dec. 4, 1989.

[30] Foreign Application Priority Data

Feb. 13, 1989 [GB] United Kingdom ................ 8903175

[51] Int. Cl.⁶ ...................... G01R 31/28; G06F 11/00
[52] U.S. Cl. .................... 395/182.09; 371/68.1
[58] Field of Search ...................... 371/9.1, 11.3, 371/16.1, 67.1, 68.1, 68.3; 364/187; 395/575, 182.08, 182.09

[56] References Cited

U.S. PATENT DOCUMENTS

| | | | |
|---|---|---|---|
| 3,829,668 | 8/1974 | Noumi | 371/68.3 |
| 3,876,987 | 4/1975 | Dalton et al. | 340/172.5 |
| 4,096,990 | 6/1978 | Strelow | 371/68.3 X |
| 4,149,069 | 4/1979 | Strelow | 371/68.3 |
| 4,181,945 | 1/1980 | Adler et al. | 371/68.3 X |
| 4,392,199 | 7/1983 | Schmitter | 364/200 |
| 4,400,792 | 8/1983 | Strelow | 371/68.3 X |
| 4,517,639 | 5/1985 | Ferrell | 364/186 |
| 4,520,482 | 5/1985 | Fourré et al. | 371/68.3 |
| 4,581,700 | 4/1986 | Farnham et al. | 364/185 |
| 4,590,549 | 5/1986 | Burrage et al. | 364/131 |
| 4,594,681 | 6/1986 | Eue et al. | 371/68.2 X |
| 4,622,667 | 11/1986 | Yount | 371/9 |
| 4,644,538 | 2/1987 | Cooper et al. | 371/11.3 |
| 4,649,469 | 3/1987 | Gabillet | 371/68.1 X |
| 4,785,453 | 11/1988 | Chandran et al. | 371/68.3 X |
| 4,873,685 | 10/1989 | Millis | 371/36 |

FOREIGN PATENT DOCUMENTS

| | | |
|---|---|---|
| 0005971 | 12/1978 | European Pat. Off. . |
| 0179425 | 4/1986 | European Pat. Off. . |
| 0216353 | 4/1987 | European Pat. Off. . |

OTHER PUBLICATIONS

Electrical Communication, vol. 60, No. 2, 1986, pp. 147–153; N. Theuretzbacher: "Expert Systems Technology for Safety–Critical Real–Time Systems" *p. 148, col. 1, lines 16–20; p. 152, col. 1, line 3—col. 2, line 12*.

*Primary Examiner*—Robert W. Beausoliel, Jr.
*Assistant Examiner*—Glenn Snyder
*Attorney, Agent, or Firm*—Robbins, Berliner & Carson

[57] ABSTRACT

An interlocking system for a railway comprises a plurality of processors (A, B and C), the system having an input (1) for receiving input information and an output (2) for providing control information. Each of the processors is adapted to test itself to check that it is operating correctly and each of the processors is also adapted to test another of the processors to check that the other processor is operating correctly, each of the processors also being so tested by another of the processors. The system is shut down or put into a more restricted mode of operation if a fault in its operation is detected, either as a result of a processor's self-testing routine or as a result of one of the processors detecting that another processor is not operating correctly. This achieves the integrity of a "dual-channel" system with only a single "channel" of hardware.

7 Claims, 2 Drawing Sheets

SYSTEM COMPRISING A PROCESSOR

CROSS REFERENCE TO RELATED APPLICATIONS

This is continuation of application Ser. No. 08/161,990 filed 3 Dec. 1993, now abandoned, which is a continuation of application Ser. No. 08/084,785 filed 29 Jun. 1993, now abandoned, which is a continuation of application Ser. No. 07/445,874 filed 4 Dec. 1989.

The present invention relates to a system comprising a processor.

In the field of railway signalling, for example, it is essential that systems be designed with safety in mind. For example, in the event of a fault in an interlocking system controlling points and/or signal lights, the system should not set the points and/or the lights to a potentially dangerous condition. More particularly, in the event of a fault, a controlled signal lamp should not be set to "green" for example, so that, for safety, a train does not have authority to proceed.

One way of seeking to achieve fault detection is to provide two (preferably dissimilar) interlocking systems in hardware and compare the control outputs of the two systems. If the output of one of the systems agrees with the output of the other system, then the operation determined by it is allowed to occur. If the outputs do not agree, then it is assumed there is a fault in one of the systems. Such an arrangement can be termed a "dual-channel" system.

According to the present invention from one aspect, there is provided a system for performing a function, the system comprising a processor and having an input for receiving information and an output, the system being such that, in use, the processor is tested to check that it is operating correctly by at least two testing methods, at least one of which methods is not carried out by the processor itself.

According to the present invention from another aspect, there is provided a system for performing a function, the system comprising a plurality of processors and having an input for receiving input information and an output, in which system:

a) each of the processors is adapted to test itself to check whether it is operating correctly; and b) each of the processors is adapted to test another of the processors to check that the other processor is operating correctly, each of the processors being so tested by another of the processors.

Figure 2:
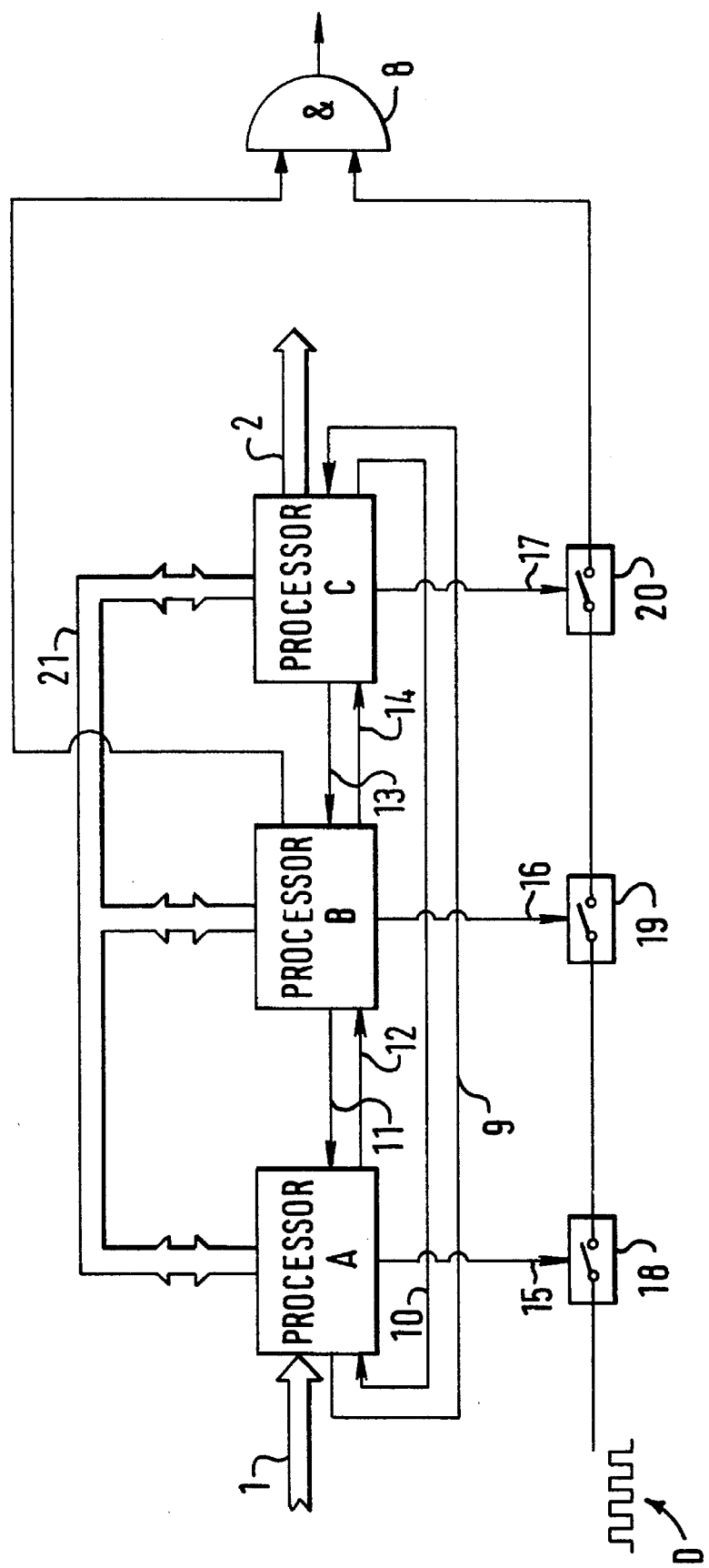

The present invention will now be described, by way of example, with reference to the accompanying drawings, in which:

FIG. 1 is a block diagram of an interlocking system for use in railway signalling; and FIG. 2 shows a preferred manner of realising of what is shown in FIG. 1.

The interlocking system to be described by way of example is for use in controlling signal lights and points at the beginning or end of a passing loop in a railway. Referring to FIG. 1, the interlocking system comprises three serially coupled processors A, B and C, input information to the system being applied via an input 1 and processed by processor A, processor B carrying out the interlocking function and control information being provided via an output 2 from processor C.

Each of the processors A, B and C is adapted to test itself by carrying out an internal, self-testing routine to check that it is operating correctly. The processors A, B and C have outputs 3, 4 and 5 respectively, on which appear signals indicative of the results of the respective self-testing routines. Outputs 3, 4 and 5 are coupled to a gate 6 which carries out an AND function. The output 7 of gate 6 is coupled to an input of a gate 8 (which also carries out an AND function) to provide to it a signal indicative either that all the processors A, B and C believe themselves to be operating correctly or that at least one of them believes it is not operating correctly.

As well as carrying out an internal, self-testing routine, each of processors A, B and C carries out test on a respective one of the other processors and has a test carried out on it by a respective one of the other processors (for example, different from the one it tests itself). Thus, for example, processor A tests processor C by interrogating it via a link 9 and receives back via a link 10 a signal depending on the result of the test; processor B tests processor A by interrogating it via a link 11 and receives back via a link 12 a signal depending on the result of the test; and processor C tests processor B by interrogating it via a link 13 and receives back via a link 14 a signal depending on the result of the test.

A signal indicative of the result of processor A's test on processor C appears on an output 15 from processor A to cause a switching device 18 to be closed if the result is that processor C is believed to be operating correctly but open otherwise; a signal indicative of the result of processor B's test on processor A appears on an output 16 from processor B to cause a switching device 19 to be closed if the result is that processor A is believed to be operating correctly but open otherwise; and a signal indicative of the result of processor C's test on processor B appears on an output 17 from processor C to cause a switching device 20 to be closed if the result is that processor B is believed to be operating correctly but open otherwise. The switching devices 18, 19 and 20 are connected in series to the other input of circuit 8 to provide to it either an indication that all the processors A, B and C are believed to be operating correctly (i.e. signal D, as a result of all the switches 18, 19 and 20 being closed) or an indication that at least one of the processors is believed not to be operating correctly (i.e. the absence of signal D, as a result of at least one of switching devices 18, 19 and 20 being open). It will be appreciated that switches 18, 19 and 20 and signal D result in the signals on outputs 15, 16 and 17 being subjected to an AND function. As an alternative, the AND function may be achieved by a discrete AND gate, to respective ones of the inputs of which the outputs 15, 16, 17 are connected, the output of the AND gate being connected to the other input of gate 8. The function of such another AND gate could, instead, be carried out by the software of one of the processors (not the one which provides by its software the function of gate 6, if such is the case—see below).

In operation, the signal at the output of gate 8 only allows the system to continue its normal controlling functions if both the signal at its input connected to the output 7 of gate 6 is indicative that all the processors A, B and C believe themselves to be operating correctly and the indication at its other input is indicative that each of the processors A, B and C is believed by another processor to be operating correctly. If either or both of these conditions is or are not fulfilled, then the signal at the output of gate 8 is such as to cause the system to be shut down or put into a different (e.g. more restricted) mode of operation.

Thus, in the described system, the integrity or "health" of each of processors A, B and C is checked in two ways, once by its own internal self-testing routine and secondly by means of a test performed on it by another processor (by way of example, not the one it is testing itself). Thus, a fault in any of the processors will be detected in two ways, one of which is not dependent on the faulty processor itself. Each detection method can independently cause the system to be shut down or put into a different (e.g. more restricted) mode of operation to ensure a safe system failure mode.

To enhance safety, detection of a fault in a processor by either or both of the above methods may be propagated around the system from processor to processor, via the inter-processor testing links, so that any of the processors can cause the system to be shut down or put into a different (e.g. more restricted) mode of operation via its respective one of outputs 15, 16 and 17 (and/or outputs 3, 4 and 5) in response to detection of a fault anywhere in the system, regardless of whether it has detected the fault itself.

The above system enables the achievement of the integrity of a "dual-channel" system using only a single "channel" of hardware.

Preferably, the system may be realised as shown in FIG. 2, in which items which are the same as in FIG. 1 have the same reference numerals as in FIG. 1. The processor B is adapted to be a so-called "vital logic module" of the system and within it the AND function of gate 6 is carried out by the processor's software, the outputs 3, 4 and 5 being included in an internal bus 21.

We claim:

1. A single channel interlocking system comprising:

a plurality of processors for collectively receiving external input information, deriving internal interlocking information from the external input information, and providing external control information based on the external input information and the internal interlocking information, such that each of said plurality of processors is responsive to different information and performs a different function of the interlocking system;

a common internal bus connecting said plurality of processors into a single hardware channel, said common internal bus including at least one external input for inputting said external input information and at least one external output for outputting said external control information;

first fault-detection means for causing each of the processors to test itself to check whether it is operating correctly and to provide a respective first operation signal dependent on the result of that test;

second fault-detection means for causing each of the processors to be tested for correct operation by a respective other of the processors and for causing said respective other processor to provide a respective second operation signal dependent on the result of that test;

first logic means for subjecting the first operation signals to a first logical function to provide a first status signal, the first status signal being of a first kind if the first operation signals are such that each of the processors determines it is operating correctly and of a second kind if the first operation signals are such that at least one of the processors determines it is not operating correctly; and second logic means for subjecting the second operation signals to a second logical function to provide a second status signal, the second status signal being of a first kind if the second operation signals are such that each of the processors testing another processor determines that said another processor is operating correctly and of a second kind if the second operation signals are such that at least one of the processors determines that the processor it is testing is not operating correctly, the first logic means and the second logic means being selected from structurally different but functionally interchangeable ones of the group consisting of a gate arrangement including at least one dedicated electronic gate, a software arrangement including at least one software controlled processor, and an electro-mechanical arrangement including a plurality of electromechanical switches, whereby each of the processors is independently tested by two dissimilar test procedures and the results from the two dissimilar test procedures are independently processed by two dissimilar logic means.

2. The single channel interlocking system of claim 1, wherein the first logic means is a gate arrangement including at least one dedicated electronic gate, and the second logic means is a software arrangement including at least one software controlled processor.

3. The single channel interlocking system of claim 1, wherein the first logic means is a gate arrangement including at least one dedicated electronic gate, and the second logic means is an electro-mechanical arrangement including a plurality of electromechanical switches.

4. The single channel interlocking system of claim 1, wherein the first logic means is a software arrangement including at least one software controlled processor, and the second logic means is a gate arrangement including at least one dedicated electronic gate.

5. The single channel interlocking system of claim 1, wherein the first logic means is a software arrangement including at least one software controlled processor, and the second logic means is an electro-mechanical arrangement including a plurality of electromechanical switches.

6. The single channel interlocking system of claim 1, wherein the first logic means is an electro-mechanical arrangement including a plurality of electromechanical switches and the second logic means is a gate arrangement including at least one dedicated electronic gate.

7. The single channel interlocking system of claim 1, wherein the first logic means is an electro-mechanical arrangement including a plurality of electromechanical switches and the second logic means is a software arrangement including at least one software controlled processor.

\* \* \* \* \*